(12) United States Patent
Ramarajan

(10) Patent No.: US 7,176,676 B2
(45) Date of Patent: *Feb. 13, 2007

(54) APPARATUSES AND METHODS FOR MONITORING ROTATION OF A CONDUCTIVE MICROFEATURE WORKPIECE

(75) Inventor: Suresh Ramarajan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/376,959

(22) Filed: Mar. 16, 2006

(65) Prior Publication Data

US 2006/0170413 A1 Aug. 3, 2006

Related U.S. Application Data

(63) Continuation of application No. 10/646,547, filed on Aug. 21, 2003, now Pat. No. 7,030,603.

(51) Int. Cl.
*G01P 3/46* (2006.01)
*G01P 3/52* (2006.01)
*B24B 5/18* (2006.01)
*B24B 5/26* (2006.01)

(52) U.S. Cl. .................. 324/164; 451/287; 15/77; 15/88.3

(58) Field of Classification Search ............. 324/160, 324/163, 164; 73/514.39, 514.31; 15/77, 15/88.1, 88.2, 88.3; 451/1, 7, 8, 287
See application file for complete search history.

(56) References Cited

U.S. PATENT DOCUMENTS

| | | | |
|---|---|---|---|
| 4,751,459 A | 6/1988 | Stupak, Jr. | |
| 5,020,283 A | 6/1991 | Tuttle | |
| 5,069,002 A | 12/1991 | Sandhu et al. | |
| 5,081,796 A | 1/1992 | Schultz | |
| 5,177,908 A | 1/1993 | Tuttle | |
| 5,232,875 A | 8/1993 | Tuttle et al. | |
| 5,234,867 A | 8/1993 | Schultz et al. | |
| 5,240,552 A | 8/1993 | Yu et al. | |
| 5,244,534 A | 9/1993 | Yu et al. | |
| 5,245,790 A | 9/1993 | Jerbic | |

(Continued)

OTHER PUBLICATIONS

DNS Electronics, LLC,, "Products", 1 page, retrieved from the Internet on Mar. 3, 2004, <http://www.dnse.com/products.htm>.

(Continued)

*Primary Examiner*—Edward Lefkowitz
*Assistant Examiner*—Kenneth J. Whittington
(74) *Attorney, Agent, or Firm*—Perkins Coie LLP

(57) ABSTRACT

Apparatuses and methods for monitoring microfeature workpiece rotation during processing, such as brushing, by monitoring characteristics corresponding to a state of a magnetic field proximate to the rotating microfeature workpiece are disclosed herein. The characteristic can depend on the relative motion between the magnetic field and the conductive material of the microfeature workpiece. The characteristic can include the strength of the magnetic field, current in an electromagnet circuit used to create the magnetic field, force exerted on the magnetic field source, or movement of the magnetic field source. The apparatus can include a feedback control device to adjust the rotation speed of the microfeature workpiece based on the characteristic detected.

41 Claims, 3 Drawing Sheets

U.S. PATENT DOCUMENTS

| | | |
|---|---|---|
| 5,245,796 A | 9/1993 | Miller et al. |
| RE34,425 E | 11/1993 | Schultz |
| 5,297,364 A | 3/1994 | Tuttle |
| 5,367,257 A | 11/1994 | Garshelis |
| 5,421,769 A | 6/1995 | Schultz et al. |
| 5,433,651 A | 7/1995 | Lustig et al. |
| 5,449,314 A | 9/1995 | Meikle et al. |
| 5,486,129 A | 1/1996 | Sandhu et al. |
| 5,514,245 A | 5/1996 | Doan et al. |
| 5,533,924 A | 7/1996 | Stroupe et al. |
| 5,540,810 A | 7/1996 | Sandhu et al. |
| 5,609,718 A | 3/1997 | Meikle |
| 5,618,381 A | 4/1997 | Doan et al. |
| 5,618,447 A | 4/1997 | Sandhu |
| 5,624,303 A | 4/1997 | Robinson |
| 5,643,060 A | 7/1997 | Sandhu et al. |
| 5,650,619 A | 7/1997 | Hudson |
| 5,658,183 A | 8/1997 | Sandhu et al. |
| 5,658,190 A | 8/1997 | Wright et al. |
| 5,664,988 A | 9/1997 | Stroupe et al. |
| 5,679,065 A | 10/1997 | Henderson |
| 5,690,540 A | 11/1997 | Elliott et al. |
| 5,698,455 A | 12/1997 | Meikle et al. |
| 5,700,180 A | 12/1997 | Sandhu et al. |
| 5,702,292 A | 12/1997 | Brunelli et al. |
| 5,730,642 A | 3/1998 | Sandhu et al. |
| 5,733,176 A | 3/1998 | Robinson et al. |
| 5,736,427 A | 4/1998 | Henderson |
| 5,738,567 A | 4/1998 | Manzonie et al. |
| 5,747,386 A | 5/1998 | Moore |
| 5,792,709 A | 8/1998 | Robinson et al. |
| 5,795,218 A | 8/1998 | Doan et al. |
| 5,795,495 A | 8/1998 | Meikle |
| 5,807,165 A | 9/1998 | Uzoh et al. |
| 5,823,855 A | 10/1998 | Robinson |
| 5,825,028 A | 10/1998 | Hudson |
| 5,830,806 A | 11/1998 | Hudson et al. |
| 5,842,909 A | 12/1998 | Sandhu et al. |
| 5,851,135 A | 12/1998 | Sandhu et al. |
| 5,868,896 A | 2/1999 | Robinson et al. |
| 5,871,392 A | 2/1999 | Meikle et al. |
| 5,879,222 A | 3/1999 | Robinson |
| 5,882,248 A | 3/1999 | Wright et al. |
| 5,893,754 A | 4/1999 | Robinson et al. |
| 5,895,550 A | 4/1999 | Andreas |
| 5,910,043 A | 6/1999 | Manzonie et al. |
| 5,919,082 A | 7/1999 | Walker et al. |
| 5,934,980 A | 8/1999 | Koos et al. |
| 5,938,801 A | 8/1999 | Robinson |
| 5,945,347 A | 8/1999 | Wright |
| 5,954,912 A | 9/1999 | Moore |
| 5,967,030 A | 10/1999 | Blalock |
| 5,972,792 A | 10/1999 | Hudson |
| 5,976,000 A | 11/1999 | Hudson |
| 5,980,363 A | 11/1999 | Meikle et al. |
| 5,981,396 A | 11/1999 | Robinson et al. |
| 5,989,470 A | 11/1999 | Doan et al. |
| 5,990,012 A | 11/1999 | Robinson et al. |
| 5,994,224 A | 11/1999 | Sandhu et al. |
| 5,997,384 A | 12/1999 | Blalock |
| 6,036,586 A | 3/2000 | Ward |
| 6,039,633 A | 3/2000 | Chopra |
| 6,040,245 A | 3/2000 | Sandhu et al. |
| 6,054,015 A | 4/2000 | Brunelli et al. |
| 6,062,958 A | 5/2000 | Wright et al. |
| 6,066,030 A | 5/2000 | Uzoh |
| 6,074,286 A | 6/2000 | Ball |
| 6,083,085 A | 7/2000 | Lankford |
| 6,090,475 A | 7/2000 | Robinson et al. |
| 6,110,820 A | 8/2000 | Sandhu et al. |
| 6,113,463 A | 9/2000 | Hasegawa et al. |
| 6,114,706 A | 9/2000 | Meikle et al. |
| 6,116,988 A | 9/2000 | Ball |
| 6,120,354 A | 9/2000 | Koos et al. |
| 6,135,856 A | 10/2000 | Tjaden et al. |
| 6,136,043 A | 10/2000 | Robinson et al. |
| 6,139,402 A | 10/2000 | Moore |
| 6,143,123 A | 11/2000 | Robinson et al. |
| 6,143,155 A | 11/2000 | Adams et al. |
| 6,152,808 A | 11/2000 | Moore |
| 6,176,763 B1 | 1/2001 | Kramer et al. |
| 6,176,992 B1 | 1/2001 | Talieh |
| 6,186,870 B1 | 2/2001 | Wright et al. |
| 6,187,681 B1 | 2/2001 | Moore |
| 6,191,037 B1 | 2/2001 | Robinson et al. |
| 6,193,588 B1 | 2/2001 | Carlson et al. |
| 6,196,899 B1 | 3/2001 | Chopra et al. |
| 6,200,901 B1 | 3/2001 | Hudson et al. |
| 6,203,404 B1 | 3/2001 | Joslyn et al. |
| 6,203,407 B1 | 3/2001 | Robinson |
| 6,203,413 B1 | 3/2001 | Skrovan |
| 6,206,754 B1 | 3/2001 | Moore |
| 6,206,756 B1 | 3/2001 | Chopra et al. |
| 6,206,759 B1 | 3/2001 | Agarwal et al. |
| 6,210,257 B1 | 4/2001 | Carlson |
| 6,213,845 B1 | 4/2001 | Elledge |
| 6,218,316 B1 | 4/2001 | Marsh |
| 6,220,934 B1 | 4/2001 | Sharples et al. |
| 6,224,466 B1 | 5/2001 | Walker et al. |
| 6,227,955 B1 | 5/2001 | Custer et al. |
| 6,234,874 B1 | 5/2001 | Ball |
| 6,234,877 B1 | 5/2001 | Koos et al. |
| 6,234,878 B1 | 5/2001 | Moore |
| 6,237,483 B1 | 5/2001 | Blalock |
| 6,238,273 B1 | 5/2001 | Southwick |
| 6,244,944 B1 | 6/2001 | Elledge |
| 6,250,994 B1 | 6/2001 | Chopra et al. |
| 6,251,785 B1 | 6/2001 | Wright |
| 6,254,460 B1 | 7/2001 | Walker et al. |
| 6,261,151 B1 | 7/2001 | Sandhu et al. |
| 6,261,163 B1 | 7/2001 | Walker et al. |
| 6,267,650 B1 | 7/2001 | Hembree |
| 6,273,786 B1 | 8/2001 | Chopra et al. |
| 6,273,796 B1 | 8/2001 | Moore |
| 6,273,800 B1 | 8/2001 | Walker et al. |
| 6,276,996 B1 | 8/2001 | Chopra |
| 6,277,015 B1 | 8/2001 | Robinson et al. |
| 6,284,660 B1 | 9/2001 | Doan |
| 6,290,579 B1 | 9/2001 | Walker et al. |
| 6,296,557 B1 | 10/2001 | Walker |
| 6,306,012 B1 | 10/2001 | Sabde |
| 6,306,014 B1 | 10/2001 | Walker et al. |
| 6,306,768 B1 | 10/2001 | Klein |
| 6,309,282 B1 | 10/2001 | Wright et al. |
| 6,312,558 B2 | 11/2001 | Moore |
| 6,313,038 B1 | 11/2001 | Chopra et al. |
| 6,325,702 B2 | 12/2001 | Robinson |
| 6,328,632 B1 | 12/2001 | Chopra |
| 6,331,135 B1 | 12/2001 | Sabde et al. |
| 6,331,139 B2 | 12/2001 | Walker et al. |
| 6,331,488 B1 | 12/2001 | Doan et al. |
| 6,338,667 B2 | 1/2002 | Sandhu et al. |
| 6,350,180 B2 | 2/2002 | Southwick |
| 6,350,691 B1 | 2/2002 | Lankford |
| 6,352,466 B1 | 3/2002 | Moore |
| 6,354,919 B2 | 3/2002 | Chopra |
| 6,354,923 B1 | 3/2002 | Lankford |
| 6,354,930 B1 | 3/2002 | Moore |
| 6,358,122 B1 | 3/2002 | Sabde et al. |
| 6,358,127 B1 | 3/2002 | Carlson et al. |
| 6,358,129 B2 | 3/2002 | Dow |
| 6,361,400 B2 | 3/2002 | Southwick |
| 6,361,417 B2 | 3/2002 | Walker et al. |
| 6,361,832 B1 | 3/2002 | Agarwal et al. |

| | | | |
|---|---|---|---|
| 6,364,749 B1 | 4/2002 | Walker |
| 6,364,757 B2 | 4/2002 | Moore |
| 6,368,190 B1 | 4/2002 | Easter et al. |
| 6,368,193 B1 | 4/2002 | Carlson et al. |
| 6,368,194 B1 | 4/2002 | Sharples et al. |
| 6,368,197 B2 | 4/2002 | Elledge |
| 6,376,381 B1 | 4/2002 | Sabde |
| 6,383,934 B1 | 5/2002 | Sabde et al. |
| 6,387,289 B1 | 5/2002 | Wright |
| 6,395,620 B1 | 5/2002 | Pan et al. |
| 6,402,884 B1 | 6/2002 | Robinson et al. |
| 6,409,576 B1 | 6/2002 | Oguri et al. |
| 6,409,586 B2 | 6/2002 | Walker et al. |
| 6,428,386 B1 | 8/2002 | Bartlett |
| 6,447,369 B1 | 9/2002 | Moore |
| 6,462,535 B1 | 10/2002 | Schwabe |
| 6,498,101 B1 | 12/2002 | Wang |
| 6,502,271 B1 | 1/2003 | Epshteyn |
| 6,520,834 B1 | 2/2003 | Marshall |
| 6,533,893 B2 | 3/2003 | Sabde et al. |
| 6,538,433 B1 | 3/2003 | Cervantes et al. |
| 6,547,640 B2 | 4/2003 | Hofmann |
| 6,548,407 B1 | 4/2003 | Chopra et al. |
| 6,579,799 B2 | 6/2003 | Chopra et al. |
| 6,592,443 B1 | 7/2003 | Kramer et al. |
| 6,609,947 B1 | 8/2003 | Moore |
| 6,623,329 B1 | 9/2003 | Moore |
| 6,633,084 B1 | 10/2003 | Sandhu et al. |
| 6,652,764 B1 | 11/2003 | Blalock |
| 6,666,749 B2 | 12/2003 | Taylor |
| 6,678,911 B2 | 1/2004 | Krupa et al. |
| 2005/0040813 A1 | 2/2005 | Ramarajan |

OTHER PUBLICATIONS

DNS Electronics, LLC, "Products—300 mm", 1 page, retrieved from the Internet on Mar. 3, 2004, <http://www.dnse.com/products_300mm.htm>.

DNS Electronics, LLC, "FC-3000", 2 pages, retrieved from the Internet on Mar. 3, 2004, <http://www.dnse.com/products_fc3000.htm>.

DNS Electronics, LLC, "AquaSpin MP-3000", 2 pages, retrieved from the Internet on Mar. 3, 2004, <http://www.dnse.com/products_mp3000.htm>.

DNS Electronics, LLC, "D-Spin SK-3000", 2 pages, retrieved from the Internet on Mar. 3, 2004, <http://www.dnse.com/products_sk3000.htm>.

DNS Electronics, LLC, "AquaSpin SS-3000", 2 pages, retrieved from the Internet on Mar, 3, 2004, <http://www.dnse.com/products_ss3000.htm>.

DNS Electronics, LLC, "Products—F-Wet", 1 page, retrieved from the Internet on Mar. 3, 2004, <http://www.dnse.com/products_fwet.htm>.

DNS Electronics, LLC, "FC-820L", 2 pages, retrieved from the Internet on Mar. 3, 2004, <http://www.dnse.com/products_fc8201.htm>.

DNS Electronics, LLC, "FC-821L", 2 pages, retrieved from the Internet on Mar. 3, 2004, <http://www.dnse.com/products_fc8211.htm>.

DNS Electronics, LLC, "Products—AquaSpin", 1 page, retrieved from the Internet on Mar. 3, 2004, <http://www.dnse.com/products_aquaspin.htm>.

DNS Electronics, LLC, "AquaSpin AS-2000", 2 pages, retrieved from the Internet on Mar. 3, 2004, <http://www.dnse.com/products_as2000htm>.

DNS Electronics, LLC, "AquaSpin M-2000", 2 pages, retrieved from the Internet on Mar. 3, 2004, <http://www.dnse.com/products_mp2000.htm>.

DNS Electronics, LLC, "AquaSpin SR-2000", 2 pages, retrieved from the Internet on Mar. 3, 2004, <http://www.dnse.com/products_sr2000.htm>.

DNS Electronics, LLC, "Products—D-Spin", 1 page, retrieved from the Internet on Mar. 3, 2004, <http://www.se.com/products_dspin.htm>.

DNS Electronics, LLC, "D-Spin SK200W", 2 pages, retrieved from the Internet on Mar. 3, 2004, <http://www.dnse.com/products_sk200w.htm>.

DNS Electronics, LLC, "D-Spin SK-2000", 2 pages, retrieved from the Internet on Mar. 3, 2004, <http://www.dnse.com/products_sk2000.htm>.

DNS Electronics, LLC, "SC-W80A-AVD", 2 pages, retrieved from the Internet on Mar. 3, 2004, <http://www.dnse.com/products_scw80aavd.htm>.

Applied Materials, Inc., "Silicon Products", 1 page, retrieved from the Internet on Mar. 3, 2004, <http://www.appliedmaterials.com/products/index.html>.

Applied Materials, Inc., "Applied Mirra Mesa Advanced Integrated CMP", 2 pages, retrieved from the Internet on Mar. 3, 2004, <http://www.appliedmaterials.com/products/mirra_mesa.html>.

Applied Materials, Inc., "Applied Reflexion CMP", 2 pages, retrieved from the Internet on Mar. 3, 2004, <http://www.appliedmaterials.com/products/reflexion.html>.

Applied Materials, Inc., "About the CMP Process", 1 page, retrieved from the Internet on Mar. 3, 2004, <http://www.appliedmaterials.com/products/about_cmp_process.html>.

Applied Materials, Inc., "CMP Technical Papers", 3 pages, retrieved from the Internet on Mar. 3, 2004, <http://www.appliedmaterials.com/products/cmp_tech_papers.html>.

APPARATUSES AND METHODS FOR MONITORING ROTATION OF A CONDUCTIVE MICROFEATURE WORKPIECE

CROSS-REFERENCE TO RELATED APPLICATION

This appilcation is a continuation of U.S. patent application Ser. No. 10/646,547, filed Aug. 21, 2003 now U.S. Pat. No. 7,030,603, which is incorporated herein by reference in its entirety.

TECHNICAL FIELD

The present invention relates to monitoring the rotation of conductive microfeature workpieces during processing, for example, during a brushing process.

BACKGROUND

Mechanical and chemical-mechanical planarization processes (collectively "CMP") remove material from the surfaces of microfeature workpieces in the production of microelectronic devices and other products. Typically the microfeature workpieces then undergo a post-CMP cleaning process. For example, FIG. 1 schematically illustrates a brushing machine 50 in accordance with the prior art used for this purpose. Such devices are available from Applied Materials of Santa Clara, Calif. The brushing machine 50 supports a microfeature workpiece 10 on rollers 20. The rollers 20 engage an edge surface 11 of the microfeature workpiece 10 and rotate as indicated by arrows A to rotate the microfeature workpiece 10 as indicated by arrow B. As the microfeature workpiece 10 rotates, it engages two rotating brushes 30. The rotating brushes 30 rotate in opposite directions to remove particles from opposing faces 12 of the microfeature workpiece 10. Optionally, the microfeature workpiece 10 can be exposed to a chemical compound while it is brushed.

One drawback with the foregoing arrangement is that the microfeature workpiece 10 occasionally stops rotating during the brushing process. As a result, the microfeature workpiece 10 may be incompletely cleaned, and may also be damaged as the rotating brushes bear against a limited portion of the microfeature workpiece 10. Furthermore, because the microfeature workpiece 10 typically rotates at high speed (e.g., about 500 rpm), it is often hard for an operator to determine that the microfeature workpiece 10 has stopped rotating.

One approach to addressing the foregoing drawback is to engage a follower wheel 40 with the edge surface 11 of the microfeature workpiece 10. The rotation of the microfeature workpiece 10 causes the follower wheel 40 to rotate. A sensor (not shown) detects whether or not the follower wheel 40 is rotating. If the follower wheel 40 ceases to rotate, the operator assumes that the microfeature workpiece 10 is no longer rotating and can remove the microfeature workpiece 10 or re-engage it with the rollers 20.

One drawback with the follower wheel 40 is that it may not be reliable. For example, the follower wheel 40 can wear out, fall out of adjustment, seize, slip, or fail in other manners that can result in a false indication of the motion (or lack of motion) of the microfeature workpiece 10. Accordingly, an operator may be unaware that the microfeature workpiece 10 has stopped rotating, or may receive false warnings that the microfeature workpiece 10 has stopped rotating.

DETAILED DESCRIPTION

A. Introduction

Figure 1:
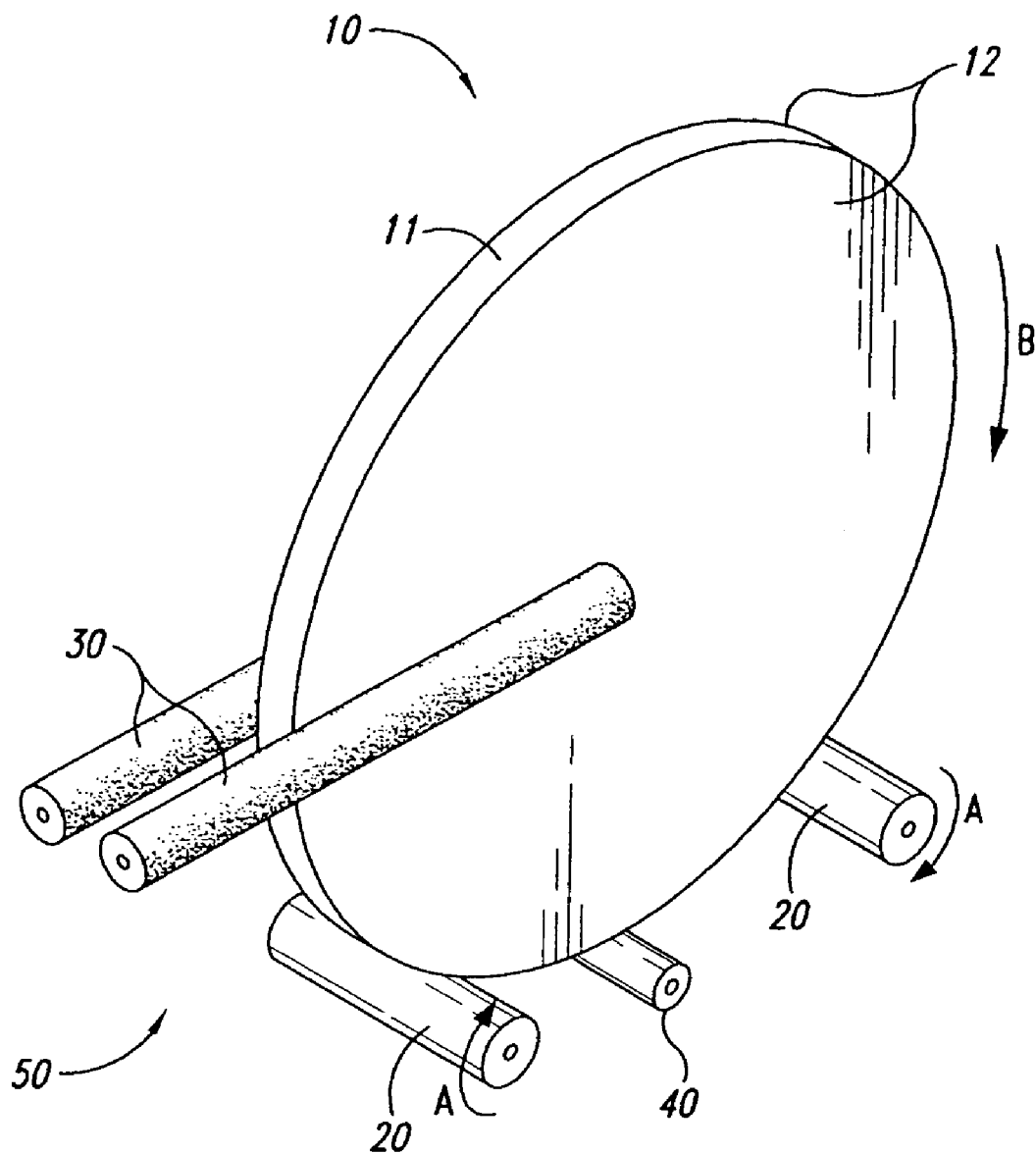
FIG. 1 is a partially schematic illustration of an apparatus having a follower wheel to monitor the rotation of the microfeature workpiece during post CMP cleaning in accordance with the prior art.

The present invention is directed toward apparatuses and methods for monitoring the rotation of a microfeature workpiece, for example, during a post-CMP brushing process. In other embodiments, apparatuses and methods can monitor the rotation speed of a microfeature workpiece during other processes. In one aspect of the invention, a method for detecting a rotation speed of a microfeature workpiece having an electrically conductive material includes supporting the microfeature workpiece, rotating the microfeature workpiece, establishing a magnetic field at least proximate to the microfeature workpiece, and detecting a change of a rotation speed of the microfeature workpiece by detecting a characteristic corresponding to a state of the magnetic field. The characteristic corresponding to the state of the magnet field can depend at least in part on relative motion, or lack of relative motion, between the conductive material of the microfeature workpiece and the magnetic field.

In a further aspect of the invention, establishing the magnetic field can include producing an electromagnetic field by applying an electrical potential to an electromagnet circuit, and detecting a characteristic corresponding to a state of the magnetic field can include detecting a change in an electrical current characteristic in the electromagnet circuit. In another aspect of the invention, establishing the magnetic field can include supporting a portion of a magnetic field source with a magnet support, and detecting the characteristic corresponding to the state of the magnetic field can include detecting a movement of the portion of the magnet field source, or detecting the force applied to the portion of the magnetic field source as the microfeature workpiece rotates. In yet a further aspect of the invention, the method can include adjusting a rotation speed of the microfeature workpiece if a change in the rotation speed of the microfeature workpiece exceeds a target value.

In another aspect of the invention, an apparatus for detecting a rotation speed of a microfeature workpiece having an electrically conductive material can include a support having an engaging surface configured to contact and rotate a microfeature workpiece, a magnetic field source positioned at least proximate to the support and being configured to produce a magnetic field at least proximate to the support, and a detection device positioned at least proximate to the support, the detection device being configured to detect a characteristic corresponding to a state of the magnetic field. The characteristic corresponding to a state of the magnetic field can depend at least in part on relative motion, or lack of relative motion, between the conductive material of the microfeature workpiece and the magnetic field.

In a further aspect of the invention, the magnetic field source can include an electromagnet coupleable to a source of electrical potential to produce a magnetic field, and the detection device can include a voltmeter or an ammeter electrically coupled to the electromagnet. In yet a further aspect of the invention, the magnetic field source can include a permanent magnet positioned at least proximate to the support and being movable relative to the support as the microfeature workpiece rotates. The detection device can include a radiation detection device positioned to detect movement of the permanent magnet. In still another aspect of the invention, the detection device can include a mechanical displacement measuring device coupled to a portion of the magnetic field source to detect the movement of the portion of the magnetic field source as the microfeature workpiece is rotated. In yet another aspect of the invention, the detection device can include a force measuring device coupled to a portion of the magnetic field source to measure the force experienced by the portion of the magnetic field source as the microfeature workpiece is rotated.

The term "microfeature workpiece" is used throughout to include a workpiece formed from a substrate upon which, and/or in which submicron circuits or components, and/or data storage elements or layers are fabricated. Submicron features in the substrate include, but are not limited to trenches, vias, lines, and holes. These features typically have a submicron width (ranging from, for example, 0.05 micron to 0.75 micron) generally transverse to a major surface (e.g., a front side or a backside) of the workpiece. The term "microfeature workpiece" is also used to include substrates upon which, and/or in which micromechanical features are formed. Such features include read/write head features and other micromechanical elements having submicron or supramicron dimensions. In any of these embodiments, the workpiece substrate is formed from suitable materials, including ceramics, and may support layers and/or other formations of other materials, including but not limited to metals, dielectric materials and photoresists.

Several specific details of the invention are set forth in the following description and in FIGS. 2 and 3 to provide a thorough understanding of certain embodiments of the invention. One skilled in the art, however, will understand that the present invention may have additional embodiments, and that other embodiments of the invention may be practiced without several of the specific features explained in the following description.

B. Apparatuses and Methods in Accordance with Embodiments of the Invention

Figure 2:
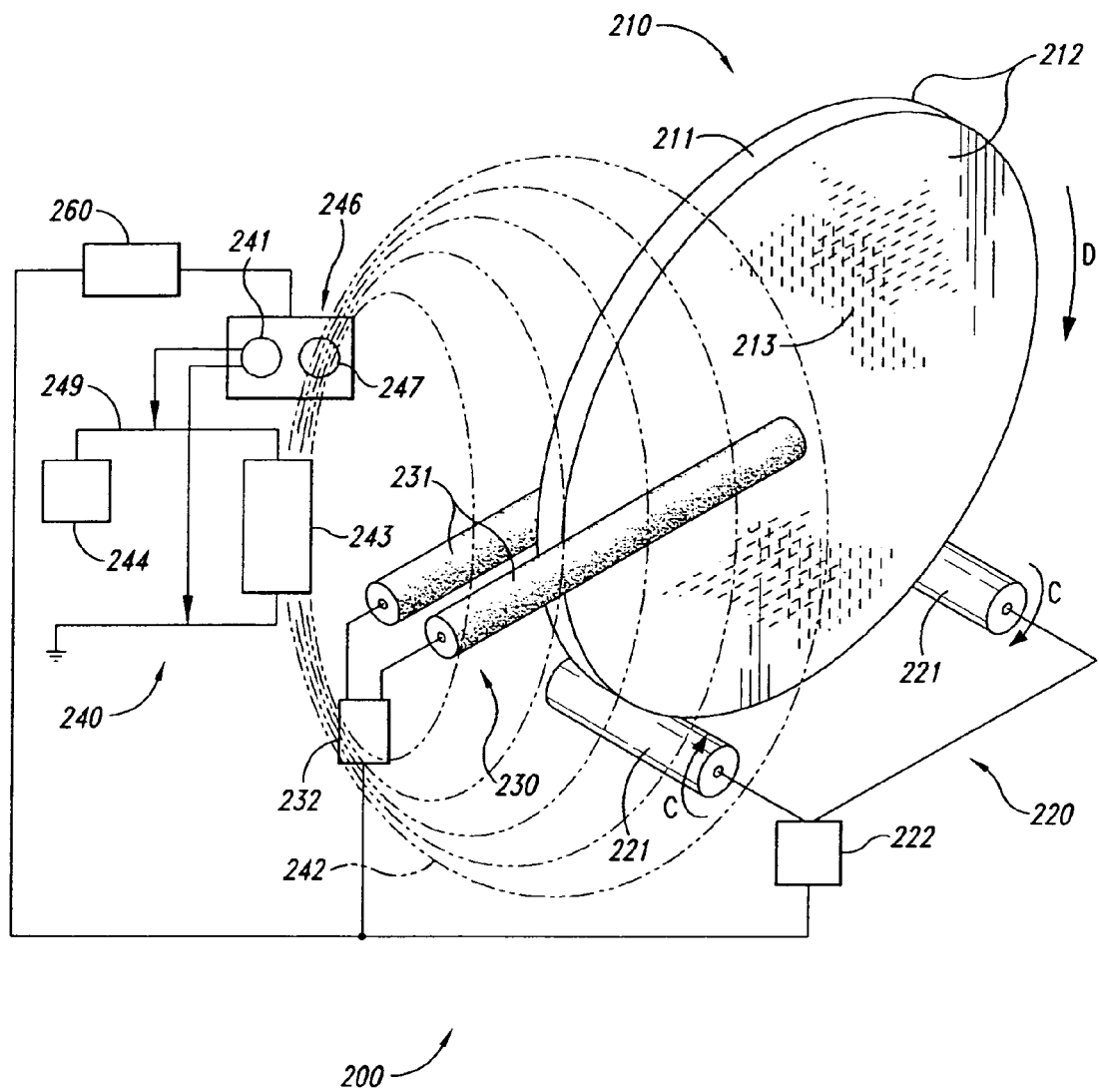
FIG. 2 is a partially schematic, isometric illustration of an apparatus configured to monitor the rotation speed of a microfeature workpiece using a magnetic field in accordance with an embodiment of the invention.

FIG. 2 is a partially schematic illustration of an apparatus 200 configured to monitor and/or adjust the rotation of a microfeature workpiece 210 in accordance with an embodiment of the invention. In one aspect of this embodiment, the apparatus 200 can generate a magnetic field 242 (represented schematically in FIG. 2 by dashed-dotted lines). In a further aspect of this embodiment, the apparatus 200 can detect the effect on the magnetic field 242 caused by a conductive material 213 (shown schematically in dashed lines in FIG. 2) of the microfeature workpiece 210 moving (or failing to move) through the magnetic field 242, as described in greater detail below.

In one embodiment, the apparatus 200 can include a support 220 positioned to carry the microfeature workpiece 210. In one aspect of this embodiment, the support 220 can include a plurality of rollers 221 (two are shown in FIG. 2) that contact an edge surface 211 of the microfeature workpiece 210. The rollers 221 can be rotated (as indicated by arrows C) by a rotation drive 222 to rotate the microfeature workpiece 210, as indicated by arrow D. In other embodiments, the apparatus 200 can include other arrangements for supporting and/or rotating the microfeature workpiece 210. For example, in some embodiments, the apparatus 200 can support and/or rotate the microfeature workpiece 210 by contacting portions of the microfeature workpiece 210 other than the edge surface 211.

In any of the foregoing embodiments, the apparatus 200 can include a processing device 230 configured to perform a process on the microfeature workpiece 210 as it rotates. In one aspect of this embodiment, the processing device 230 can include one or more brushes 231 (two are shown in FIG. 2) that can remove particles from opposing faces 212 of the microfeature workpiece 210 and/or polish the faces 212. In a particular aspect of this embodiment, the brushes 231 can be elongated and can extend laterally across the faces 212 of the microfeature workpiece. In other embodiments, the brushes 231 can have other configurations. In any of these embodiments, the brushes 231 can be rotated by a brush drive device 232. The brush drive device 232 can also control the amount of pressure the brushes 231 apply normal to the faces 212 of the microfeature workpiece 210. In still further embodiments, the processing device 230 can include elements or features in addition to or in lieu of the brushes 231 to perform cleaning and/or other processes on the microfeature workpiece 210 as the microfeature workpiece 210 rotates. In any of these embodiments, the effect of the microfeature workpiece 210 on the magnetic field 242 can be used to determine whether and/or how fast the microfeature workpiece 210 is rotating, as described in greater detail below.

In one embodiment, the apparatus 200 includes a magnetic field source 240 having a magnet 243 that imposes the magnetic field 242 proximate to the microfeature workpiece 210. In particular aspects of this embodiment, the magnetic field source 240 can include an electromagnet, a permanent magnet, or another device that can form the magnetic field 242. The state of the magnetic field 242 can depend on the relative motion, or lack of relative motion, between the magnetic field 242 and the conductive material 213 of the microfeature workpiece 210. Accordingly, the rotational state of the microfeature workpiece 210 (e.g., whether and/or how fast the microfeature workpiece 210 rotates, or changes rotational velocity) can be detected by detecting characteristics corresponding to a state of the magnetic field 242 as the conductive material 213 of the microfeature workpiece 210 passes through the magnetic field 242. In one embodiment, the conductive material 213 can include conductive lines and/or vias positioned at or below the faces 212 of the workpiece 210. In other embodiments, the conductive material 213 can include other conductive or at least partially conductive features.

In any of the foregoing embodiments, a characteristic corresponding to the state of a magnetic field 242 as the conductive material 213 moves (or fails to move) can be detected by a detection device 246. In one embodiment, the detection device 246 can directly detect characteristics of the state of the magnetic field 242. For example, the detection device 246 can include a magnetic sensor 247 (e.g., a magnetic flux valve or a compass) that senses or measures the magnetic field 242. The magnetic sensor 247 can be particularly suitable for embodiments in which the magnet 243 includes a permanent magnet rather than an electromagnet. In other embodiments (described in greater detail below), the detection device 246 can more indirectly detect characteristics of the magnetic field 242.

When the magnet 243 includes an electromagnet, the magnetic field source 240 can include an electrical potential source 244 connected to the magnet 243 with an electromagnet circuit 249. In one embodiment, the electrical potential source 244 can deliver a constant current and/or a constant voltage, and in another embodiment, the electrical potential source can deliver a variable current and/or a variable voltage. In either embodiment, the detection device 246 can include an electrical circuit device 241 positioned to measure changes in the voltage or current of the electromagnet circuit 249, which result from the interaction between the magnetic field 242 and the conductive material 213 in the microfeature workpiece 210. For example, changes in the voltage, current or other characteristic of the electromagnetic circuit 249 can be induced by changes in the magnetic field 242, which are in turn caused by changes in the rotation rate of the microfeature workpiece 210. In one aspect of this embodiment, the electrical circuit device 241 can include an ammeter coupled in series with the electromagnet circuit 249. In another embodiment, the electrical circuit device 241 can include a voltmeter coupled in parallel across the magnet 243. Suitable electrical circuit devices 241 for either embodiment are available from Itron, Inc. of Spokane, Wash. The apparatus 200 can include the electrical circuit device 241 in addition to the magnetic sensor 247 (as shown in FIG. 2) or in lieu of the magnetic sensor 247. In still further embodiments, the apparatus 200 can include other detection devices 246 that indirectly detect the effect of the microfeature workpiece 210 on the magnetic field 242.

In any of the foregoing embodiments, the detection device 246 can detect a change in the magnetic field 242 caused by a change in the rotation speed of the microfeature workpiece 210. For example, as the microfeature workpiece 210 rotates at a selected rate, the conductive material 213 passes through the magnetic field 242 and can change a characteristic (such as the magnetic flux) of the magnetic field 242 at a corresponding rate. If the rotation rate of the microfeature workpiece 210 changes, the effect on the magnetic field 242 also changes, and the effect can be detected by the detection device 246. In one embodiment, the detection device 246 can detect when the microfeature workpiece 210 ceases to rotate. In another embodiment, the detection device 246 can detect when the rotation rate of the microfeature workpiece 210 changes (either upwardly or downwardly) without requiring that the microfeature workpiece 210 cease rotating. As described above, the detection can be direct (e.g., when the magnetic sensor 247 detects a change in the magnetic flux of the magnetic field 242) or indirect (e.g., when the electrical circuit device 241 detects a change in the current flowing through the electromagnetic circuit 249, induced by a change in the magnetic field 242).

In one embodiment, the detection device 246 can display a measured value corresponding directly or indirectly to the state of the magnetic field 242. In another embodiment, the detection device 246 can provide an alert (visual, aural or otherwise) when the change in the magnetic field characteristic corresponds to a change in rotation rate that exceeds a target value. For example, the detection device 246 can provide an alert when the microfeature workpiece 210 ceases to rotate.

In still a further embodiment, the apparatus 200 can include a feedback control device 260 to adjust the input to the rotation drive 222 and/or the brush drive device 232 based on the information received from the detection device 246. Accordingly, the feedback control device 260 can be operatively coupled between the detection device 246 and both the rotation drive 222 and the brush drive device 232. In one embodiment, the feedback control device 260 can direct the rotation drive 222 to stop the rollers 221 when the detection device 246 detects no rotation of the microfeature workpiece 210. Accordingly, the feedback control device 260 can automatically prevent the brushes 231 from rotating against the microfeature workpiece 210 while the microfeature workpiece 210 is stationary. In another embodiment, the feedback control device 260 can direct the rotation drive 222 to increase or decrease the rate at which the microfeature workpiece 210 rotates, for example, if the detection device 246 detects a rotation rate that is outside a selected range. The selected range can be factory set and/or adjustable by the user. In other embodiments, multiple ranges can be set and multiple adjustments can be made using various methods to affect the rotation rate, including stopping the rotation of the microfeature workpiece 210 if the rotational rate cannot be maintained within a certain range. In still further embodiments, the feedback control device 260 can be operably coupled to the brush drive device 232 to increase or decrease the normal force applied to the faces 212 of the microfeature workpiece 210 by the brushes 231, and/or to increase or decrease the rotation rate of the brushes 231.

One feature of embodiments of the apparatus 200 is that it can monitor the rotation of the microfeature workpiece 210 by sensing characteristics corresponding to a state of the magnetic field 242. Accordingly, the detection device 246 need not contact the microfeature workpiece 210 directly. An advantage of this feature is that the detection device 246 is less likely to fail, slip, or require adjustment when compared to mechanical systems, such as the one described above with reference to FIG. 1. Accordingly, embodiments of the apparatus 200 can monitor the rotation speed of the microfeature workpiece 210 more reliably, and more accurately than can existing mechanical systems.

Figure 3:
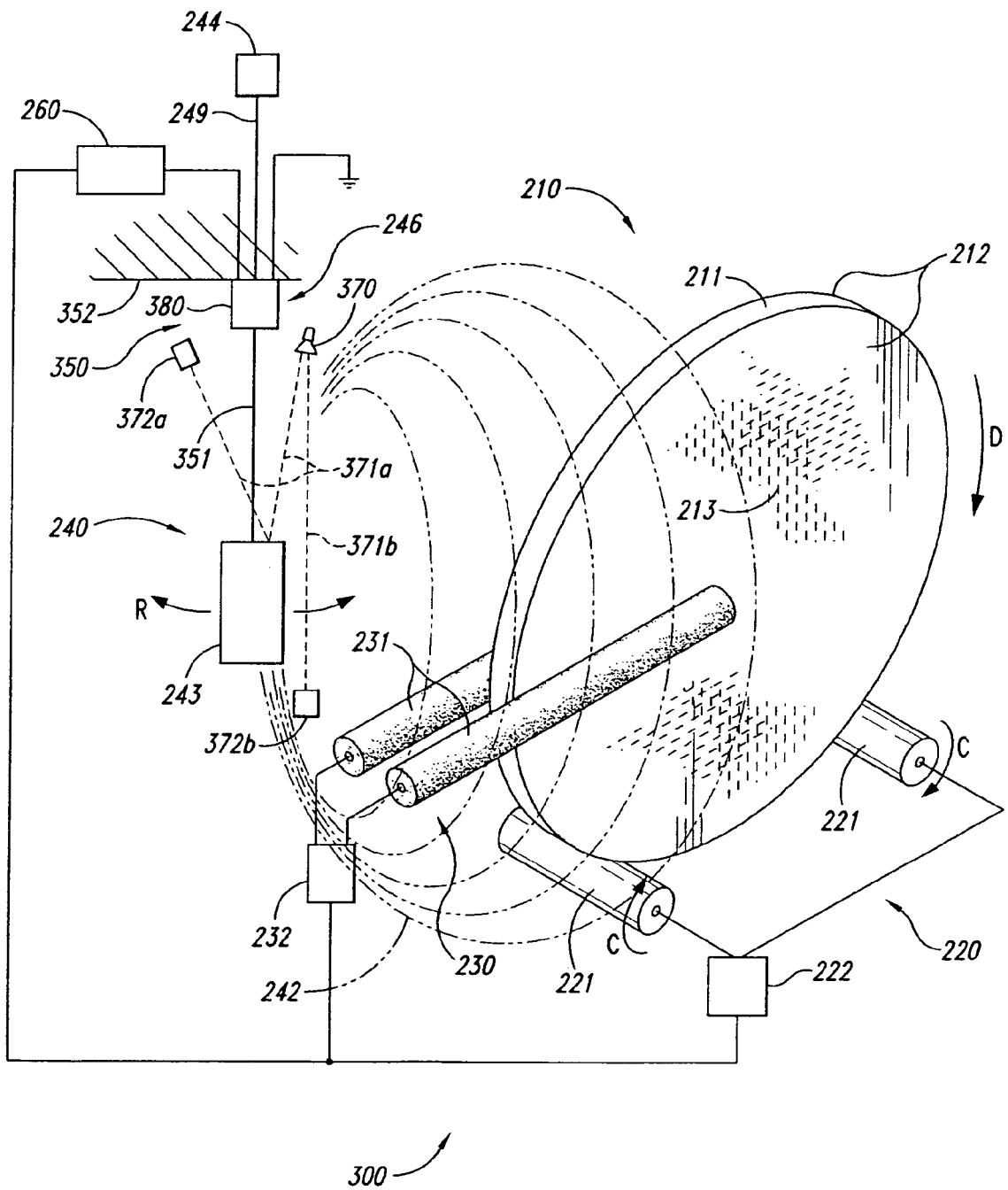
FIG. 3 is a partially schematic, isometric illustration of an apparatus configured to monitor the rotation speed of a microfeature workpiece using a magnetic field in accordance with another embodiment of the invention.

FIG. 3 is a partially schematic illustration of an apparatus 300 configured to detect a change in the rotation rate of the microfeature workpiece 210 in accordance with another embodiment of the invention. In one aspect of this embodiment, the apparatus 300 can detect the change in the rotation rate of the microfeature workpiece 210 by detecting the change in the force applied by the magnetic field 242 to an object placed within the magnetic field 242. For example, in one embodiment, the magnetic field 242 is imposed by a magnetic field source 240 that includes a magnet 243 supported by a magnet support 350. The magnet 243 can include a permanent magnet, an electromagnet, or another magnetic field producing device. The magnet support 350 can include a generally fixed base 352 and a coupler 351 coupled between the magnet 340 and the base 352 either directly or through other structures or components, such as the detection device 246.

In one embodiment, the detection device 246 includes a measuring device 380. In one aspect of this embodiment, the coupler 351 is generally rigid and is connected to the base 352 through the measuring device 380 in a manner such that the force exerted on the magnet 243 by the magnetic field 242 is transmitted to the measuring device 380. The measuring device 380 can include a force measuring device, e.g. a strain gauge that measures the force transmitted by the coupler 351. In another embodiment, the coupler 351 can be generally rigid and can be connected to the base 352 through the measuring device 380 in a manner such that the magnet 243 is free to move relative to at least one axis due to the force created by the magnetic field 242. Accordingly, the measuring device 380 can include a displacement measuring device that monitors the movement of the magnet 243 transmitted through the coupler 351. In any of the foregoing embodiments, the force exerted on the magnet 243 can change as the rotational rate of the microfeature workpiece 210 changes.

In another embodiment, the coupler 351 can be rigid or nonrigid and can couple the magnet 243 to the base 352 while allowing the magnet 243 to move freely under the influence of the magnetic field 242 relative to at least one axis, as indicated by arrow R. In one aspect of this embodiment, the detection device 246 can include a radiation detection device 370 used to detect the movement of the magnet 243. In a particular aspect of this embodiment, the radiation detection device 370 can be configured to detect the movement of the magnet 243, for example, by detecting a radiation beam 371a emitted by a radiation source 372a and reflected by the magnet 243 or the coupler 351. In another embodiment, the radiation detection device 370 can detect when the magnet 243 or coupler 351 moves sufficiently to break a radiation beam 371b emitted by a radiation source 372b. In either of the foregoing embodiments, the radiation detection device 370 can detect visible light and/or other types of radiation.

In any of the foregoing embodiments, a feedback control device 260 can be configured to receive input from any detection device used to detect a characteristic corresponding to the state of the magnetic field 242. The feedback control device 260 can also be configured to direct control signals to other components that can affect the rotation speed of the microfeature workpiece 210, or the operation of the processing device 230 as described in the above discussion of FIG. 2.

From the foregoing, it will also be appreciated that specific embodiments of the invention have been described herein for purpose of illustration, but that various modifications may be made without deviating from the spirit and scope of the invention. For example, in other embodiments, other arrangements can be used to detect a characteristic corresponding to a state of the magnetic field which is influenced by the relative motion, or lack of motion, between the microfeature workpiece and the magnetic field. Apparatuses and methods in accordance with still further embodiments can include other combinations of the features described above. Accordingly, the invention is not limited except as by the following claims.

I claim:

1. A method for detecting a rotational state of a microfeature workpiece, comprising:
   supporting the microfeature workpiece, the microfeature workpiece including a substrate carrying an electrically conductive material;
   rotating the microfeature workpiece;
   establishing a magnetic field at least proximate to the microfeature workpiece so that the electrically counductive material alters a state of the magnetic field when the microfeature workpiece is rotated; and
   detecting a change of a rotation speed of the microfeature workpiece by detecting a change in a characteristic corresponding to the state of the magnetic field, the characteristic depending at least in part on relative motion, or lack of relative motion, between the conductive material of the microfeature workpiece and the magnetic field.

2. The method of claim 1 wherein establishing the magnetic field includes applying an electrical potential to an electromagnet circuit.

3. The method of claim 1 wherein establishing the magnetic field includes positioning a permanent magnet at least proximate to the microfeature workpiece.

4. The method of claim 1 wherein establishing the magnetic field includes producing a magnetic field by applying a constant electrical potential to an electromagnet circuit, and wherein detecting a characteristic corresponding to a state of the magnetic field includes detecting a change in a voltage in the electromagnet circuit.

5. The method of claim 1 wherein establishing the magnetic field includes producing a magnetic field by applying a constant electrical potential to an electromagnet circuit, and wherein detecting a characteristic corresponding to a state of the magnetic field includes detecting a change in a current flowing through the electromagnet circuit.

6. The method of claim 1 wherein establishing the magnetic field includes supporting at least a portion of a magnetic field source with a magnet support, the portion of the magnetic field source being movable relative to the microfeature workpiece, and wherein detecting the characteristic corresponding to the state of the magnetic field includes detecting a movement of the portion of the magnetic field source as the microfeature workpiece rotates.

7. The method of claim 1 wherein establishing the magnetic field includes supporting at least a portion of a magnetic field source with a magnet support, the portion of the magnetic field source being movable relative to the microfeature workpiece, and wherein detecting the characteristic corresponding to the state of the magnetic field includes detecting a movement of the portion of the magnetic field source by monitoring characteristics of a radiation beam directed to detect movement of magnet as the microfeature workpiece rotates.

8. The method of claim 1 wherein establishing the magnetic field includes supporting at least a portion of a magnetic field source with a magnet support, the portion of the magnetic field source being movable relative to the microfeature workpiece, and wherein detecting the characteristic corresponding to the state of the magnetic field includes detecting a movement of the portion of the magnetic field source by monitoring characteristics of a light beam directed to detect movement of magnet as the microfeature workpiece rotates.

9. The method of claim 1, further comprising ceasing to rotate the microfeature workpiece if a change in the rotation speed of the microfeature workpiece exceeds a target value.

10. The method of claim 1, further comprising:
    ceasing to rotate the microfeature workpiece if a change in the rotation speed of the microfeature workpiece exceeds a target value; and
    removing the microfeature workpiece from the support when the microfeature workpiece ceases to rotate.

11. The method of claim 1, further comprising adjusting a rotation speed of the microfeature workpiece if a change in the rotation speed of the microfeature workpiece exceeds a target value.

12. The method of claim 1, further comprising removing material from the microfeature workpiece as it rotates.

13. The method of claim 1 wherein detecting the characteristic corresponding to the state of the magnetic field includes detecting a variation in the magnetic field using a magnetic sensor.

14. The method of claim 1 wherein the microfeature workpiece includes a first face, a second face facing opposite from the first face, and an edge surface between the first and second faces, and wherein the method further comprises supporting the edge surface while rotating the microfeature workpiece.

15. The method of claim 1 wherein:
supporting the microfeature workpiece includes supporting the microfeature workpiece with a workpiece support; and
rotating the microfeature workpiece includes rotating the microfeature workpiece while the microfeature workpiece is carried by the workpiece support.

16. The method of claim 1, further comprising:
removing material from at least one face of the microfeature workpiece with at least one rotating brush; and
adjusting a rotation speed of the microfeature workpiece by reducing pressure applied by the at least one rotating brush normal to a face of the microfeature workpiece if a change in the rotation speed of the microfeature workpiece exceeds a target value.

17. An apparatus for detecting a rotational state of a microfeature workpiece, the apparatus comprising:
a support having an engaging surface configured to contact and rotate a microfeature workpiece that includes a substrate carrying an electrically conductive material;
a magnetic field source positioned at least proximate to the support, the magnetic field source being configured to produce a magnetic field at least proximate to the support so that when the support rotates the microfeature workpiece, the electrically counductive material alters a state of the magnetic field; and
a detection device positioned at least proximate to the support, the detection device being configured to detect a characteristic corresponding to the state of the magnetic field, the characteristic depending at least in part on relative motion, or lack of relative motion, between the conductive material of the microfeature workpiece and the magnetic field.

18. The apparatus of claim 17 wherein the magnetic field source includes an electromagnet.

19. The apparatus of claim 17, further comprising the microfeature workpiece.

20. The apparatus of claim 17 wherein the magnetic field source includes a permanent magnet.

21. The apparatus of claim 17 wherein the magnetic field source includes an electromagnet, coupleable to a source of electrical potential to produce a magnetic field, and wherein the detection device includes a voltmeter electrically coupled to the electromagnet.

22. The apparatus of claim 17 wherein the magnetic field source includes an electromagnet, coupleable to a source of electrical potential to produce a magnetic field, and wherein the detection device includes an ammeter electrically coupled to the electromagnet.

23. The apparatus of claim 17 wherein the magnetic field source includes a magnet positioned at least proximate to the support, the magnet being movable relative to the support as the microfeature workpiece rotates.

24. The apparatus of claim 17 wherein the magnetic field source includes a magnet positioned at least proximate to the support, the magnet being movable relative to the support as the microfeature workpiece rotates, and wherein the detection device includes a radiation detection device positioned to detect movement of the magnet.

25. The apparatus of claim 17 wherein the magnetic field source includes a magnet positioned at least proximate to the support, the magnet being movable relative to the support as the microfeature workpiece rotates, and wherein the magnet is supported by a non-rigid support coupled between the magnet and a generally fixed base.

26. The apparatus of claim 17 wherein the detection device includes a displacement measuring device coupled to a portion of the magnetic field source.

27. The apparatus of claim 17 wherein the detection device includes a force measuring device coupled to a portion of the magnetic field source.

28. The apparatus of claim 17, further comprising a feedback control device, coupled between the detection device and the support, the feedback control device configured to receive at least one input signal from the detection device and direct at least one control signal to the support to control a rotation speed of the microfeature workpiece.

29. The apparatus of claim 17, further comprising a feedback control device configured to receive at least one rotation speed change threshold value and configured to direct rotation of the microfeature workpiece to cease when the detection device detects a microfeature workpiece rotation speed change that exceeds the at least one rotation speed change threshold value.

30. The apparatus of claim 17, further comprising a feedback control device configured to receive at least one rotation speed change threshold value and configured to direct at least one adjustment to a rotation speed of the microfeature workpiece when the detection device detects a microfeature workpiece rotation speed change that exceeds the at least one rotation speed change threshold value.

31. The apparatus of claim 17, further comprising at least one rotating brush positioned to engage at least one face of the microfeature workpiece, the at least one brush being positioned to remove material from the at least one face of the microfeature workpiece.

32. The apparatus of claim 17, further comprising:
at least one rotating brush positioned to engage at least one face of the microfeature workpiece, the at least one brush being positioned to remove material from the at least one face of the microfeature workpiece;
a brush drive device configured to be operatively coupled to the at least one rotating brush; and
a feedback control device coupled between the detection device and the rotating brush drive device, the feedback control device being configured to receive at least one input signal from the detection device and direct at least one control signal to the rotating brush drive device to control a rotation speed of the microfeature workpiece.

33. The apparatus of claim 17, further comprising a feedback control device configured to receive at least one rotation speed change threshold value and configured to direct at least one adjustment to a rotation speed of the microfeature workpiece when the detection device detects a microfeature workpiece rotation speed change that exceeds the at least one rotation speed change threshold value, and wherein the feedback control device is configured to direct the rotation of the microfeature workpiece to cease when the detection device detects that the microfeature workpiece rotation speed still exceeds the at least one rotation speed change threshold value after the at least one adjustment has been made.

34. An apparatus for detecting a rotational state of a microfeature workpiece, the apparatus comprising:
support means for supporting and rotating a microfeature workpiece that includes a substrate and an electrically conductive material,
magnetic field means for producing a magnetic field at least proximate to the support so that when the support rotates the microfeature workpiece, the electrically counductive material alters a state of the magnetic field; and detection means for detecting a characteristic corresponding to the state of the magnetic field, the characteristic depending at least in part on relative motion, or lack of relative motion, between the conductive material of the microfeature workpiece and the magnetic field.

35. The apparatus of claim 34 wherein the magnetic field means is configured to apply an electrical potential to an electromagnet circuit.

36. The apparatus of claim 34 wherein the magnetic field means includes a permanent magnet positioned at least proximate to the microfeature workpiece.

37. The apparatus of claim 34 wherein the magnetic field means is configured to produce a magnetic field by applying a constant electrical potential to an electromagnet circuit, and the detection means is configured to detect a change in an electrical characteristic of the electromagnet circuit.

38. The apparatus of claim 34 wherein the magnetic field means is configured to support a portion of a magnetic field source with a magnet support, the portion of the magnetic field source being movable relative to the microfeature workpiece, and the detection means is configured to detect movement of the portion of the magnetic field source as the microfeature workpiece rotates.

39. The apparatus of claim 34 wherein the magnetic field means is configured to support a portion of a magnetic field source with a magnet support, and the detection means is configured to detect forces exerted on the portion of the magnetic field source as the microfeature workpiece rotates.

40. The apparatus of claim 34, further comprising a means for ceasing to rotate the microfeature workpiece when a change in a rotation speed of the microfeature workpiece exceeds a target value.

41. The apparatus of claim 34, further comprising a means for adjusting a rotation speed of the microfeature workpiece when a change in a rotation speed of the microfeature workpiece exceeds a target value.

* * * * *